United States Patent [19]

Nicia et al.

[11] Patent Number: 4,492,426
[45] Date of Patent: Jan. 8, 1985

[54] OPTICAL BRANCH COUPLER

[75] Inventors: Antonius J. A. Nicia; Cornelis J. T. Potters, both of Eindhoven, Netherlands

[73] Assignee: U.S. Philips Corporation, New York, N.Y.

[21] Appl. No.: 372,358

[22] Filed: Apr. 27, 1982

[30] Foreign Application Priority Data

May 4, 1981 [NL] Netherlands .................. 8102183

[51] Int. Cl.³ ............... G02B 7/26; F16M 11/08
[52] U.S. Cl. ................... 350/96.15; 248/157
[58] Field of Search ........... 248/157, 419, 425; 269/60, 71, 76; 350/96.15, 96.16, 96.20

[56] References Cited

U.S. PATENT DOCUMENTS 3,849,857 11/1974 Murray, Jr. .................. 269/60
4,193,317 3/1980 Oono et al. .................. 269/71
4,432,601 2/1984 Mannschke .................. 350/96.19

FOREIGN PATENT DOCUMENTS 19001 2/1981 Japan .................. 350/96.15
2071867 9/1981 United Kingdom .................. 350/96.20

*Primary Examiner*—William L. Sikes
*Assistant Examiner*—Frank González
*Attorney, Agent, or Firm*—Marc D. Schechter

[57] ABSTRACT

An optical branch coupler comprising a semi-transparent mirror which is tiltable about an axis which is situated substantially in the plane of the mirror and substantially parallel to the plane determined by the directions of the transmitted and the reflected light beams. A wall toward which the reflected beam is directed is adjustable about an axis which is at right angles to the plane of the light beams.

12 Claims, 7 Drawing Figures

OPTICAL BRANCH COUPLER

BACKGROUND OF THE INVENTION

The invention relates to an optical branch coupler for splitting a light beam into two further light beams or for combining two light beams into a single light beam. The coupler comprises a housing which accommodates an optical element. The optical element is arranged between a first and a second side wall. It conducts a part of a light beam which is radiated through a first opening in the first wall to a second opening in the second wall. The optical element also reflects a further part of the light beam through an opening in a third side wall which extends at a right angle to the substantially parallel first and second walls. The optical element is arranged to be adjustable.

An optical branch coupler of this kind is known from published United Kingdom patent application No. 2,012,984 (corresponding to German Offenlegungsschrift No. 29.00.895). The device described therein comprises an optical distribution element for distributing an incoming light beam between two exits. In order to obtain a desirable transmission of light from an entrance to an exit with a minimal loss of light, the optical element should be adjustable. However, this patent application does not disclose how the distribution element is to be adjusted.

SUMMARY OF THE INVENTION

It is an object of the invention to provide an optical branch coupler which comprises simple structural means for adjusting the orientation of the optical element so that the transmission of light between the entrance and the exit, can be adjusted by way of two simple, independent adjustments.

To achieve this, in the optical branch coupler according to the invention, the optical element is mounted to be adjustable about a first axis which extends parallel to an optical surface of the optical element and parallel to the bottom of the housing. The bottom of the housing encloses an angle of substantially 90° with respect to all walls. At least the third wall of the housing is connected to the first or the second wall so that it is adjustable about a second axis which is directed perpendicular to the bottom of the housing.

The optical element may be a semitransparent mirror, a color selective mirror (or color filter), a pentaprism with reflective side faces, or even a plane parallel glass plate, depending on the application of the optical branch coupler. One application of the coupler may be, for example, for combining or splitting light signals of different wavelength which are transmitted or received via a single glass optical fiber. A further application of the coupler is, for example, the "monitoring" of the light output of a semiconductor laser. For the latter purpose a glass plate is arranged in the light beam in order to extract only a fraction (approximately 8%) of the light in order to form a test signal for controlling the laser.

DESCRIPTION OF THE PREFERRED EMBODIMENTS

Figure 1A:
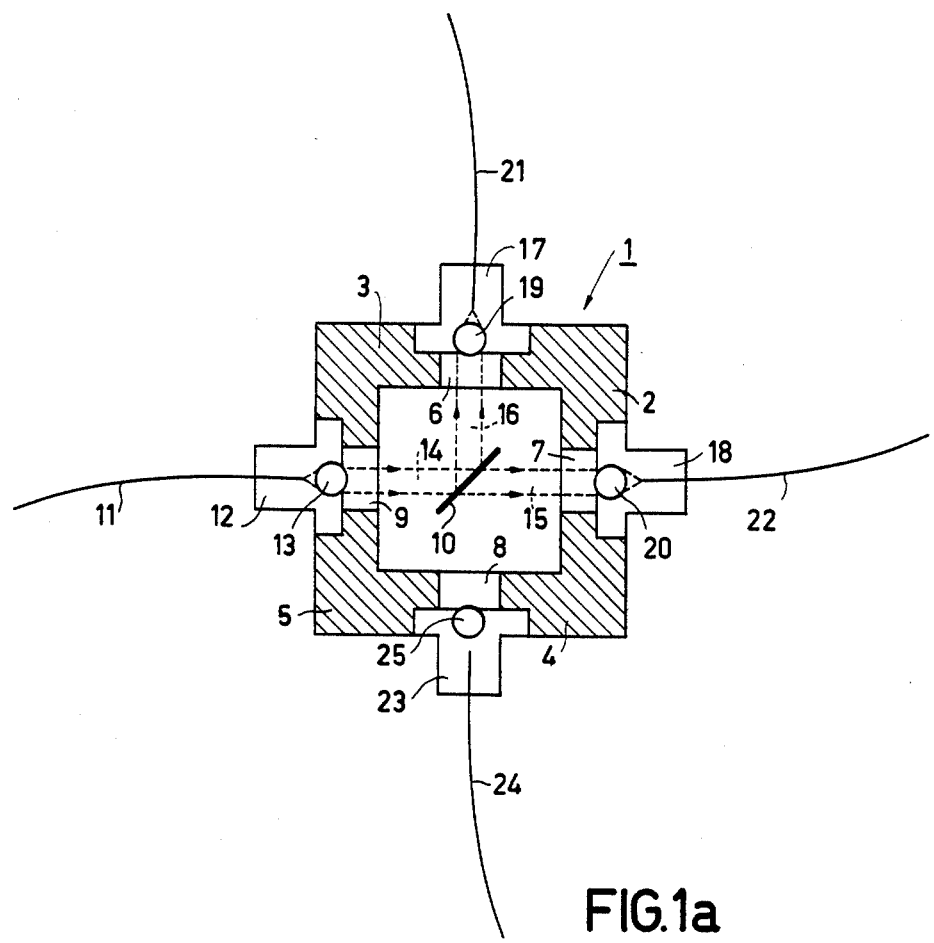
FIGS. 1a and 1b schematically show an optical branch coupler and an optical diagram thereof.

The optical branch coupler which is shown schematically in FIG. 1 comprises a housing 1 whose four side walls 2, 3, 4, and 5 each comprise an opening 7, 6, 8, and 9, respectively. In the housing 1 there is arranged a semitransparent plane parallel mirror 10 which transmits a part of a light beam 14. (Light beam 14 comes from an optical fiber 11 mounted in a connector 12, via a spherical lens 13.) The transmitted part of light beam 14 passes through to the opening 7 in the wall 2 as (light beam 15). Mirror 10 reflects the remaining light from beam 14 toward the opening 6 in the wall 3 as (light beam 16).

Connectors 17 and 18 are secured to the walls 3 and 2, respectively by means of known coupling means (not shown for the sake of clarity). The light beams 16 and 15 are focused onto the optical fibers 21 and 22, respectively by means of lenses 19 and 20 secured in the connectors 17 and 18.

A fourth connector 23, in which there are secured an optical fiber 24 and an associated lens 25, is coupled to the wall 4. Light can also be radiated into the housing 1 via the optical fiber 24; this light will also be distributed between the fibers 21 and 22 by the semitransparent mirror 10.

It will be apparent that the mirror 10 must be accurately oriented with respect to the lenses 13, 19, 20 and 25. The mirror 10 has hardly any effect on the position of the transmitted part 15 of the light beam 14 with respect to the fiber 22. Therefore, the walls 2 and 5 and the openings 7 and 9 are preferably worked in the same clamping position on a chipping machine (such as a milling machine) during the manufacture of the housing 1, so that desirable reference faces are provided for the connectors 12 and 18. This will ensure a high positional and directional accuracy for the connectors 12 and 18 with respect to one another.

Figure 1B:
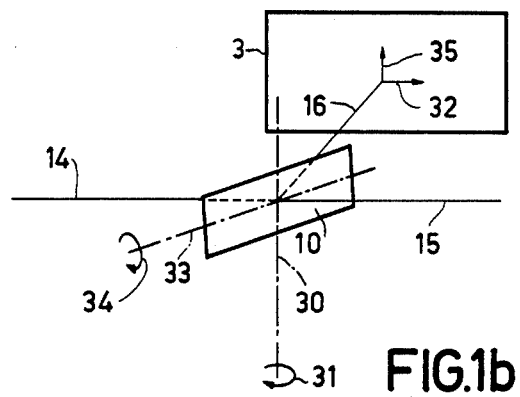

The mirror 10 reflects a part 16 of the light beam 14. It will be apparent that the orientation of the mirror 10 will determine the extent to which the reflected light beam 16 is directed into the fiber 21 via the lens 19. This situation is illustrated in FIG. 1b which schematically shows the light beams 14, 15, and 16; the mirror 10, and the wall 3. When the mirror 10 is rotated about an axis 30 (directed perpendicular to the light beams 14 and 16) in the direction denoted by the arrow 31, the point of incidence of the light beam 16 on the wall 3 will move in the direction of the arrow 32. When the mirror 10 is rotated about an axis 33 (in the phase of mirror 10 perpendicular to the axis 30, and at an angle of approximately 45° with respect to the light beam 14), the point of incidence of the light beam 16 on the wall 3 will in the first instance move in the direction of the arrow 35. Thus, an adjustment for an exact coupling (with a low light loss) can be made by means of two adjustment operations.

Figure 2A:
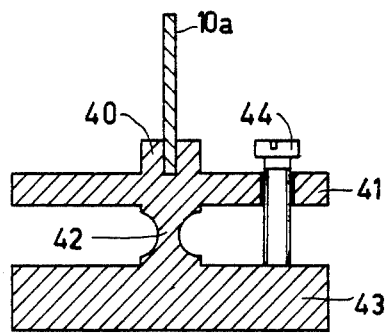
FIGS. 2a, 2b, and 2c are cross-sections through some embodiments of an adjustable mirror arrangement according to the invention.

FIG. 2a is a sectional view of a part of the branch coupler according to with the invention. The mirror 10a is glued into a slot formed in a thickened portion 40 of a mounting plate 41. The mounting plate 41 is connected to the bottom 43 of the housing by means of an elastic bridge 42. The mirror 10a can be adjusted with respect to the bottom 43, against the force of the elastic bridge 42, by means of an adjusting screw 44.

Figure 2B:
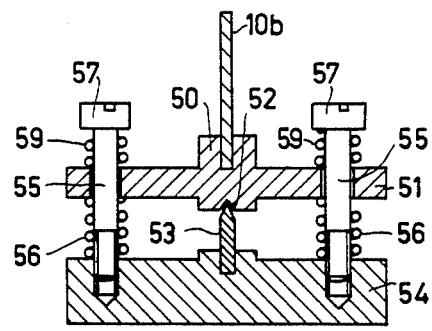

FIG. 2b is a sectional view of a part of another branch coupler according to the invention. The mirror 10b is glued into a slot formed in a thickened portion 50 on a mounting plate 51. Opposite the slot in the thickened portion 50 there is formed a V-groove 52 in which a blade 53 projects. The blade 53 in turn is secured in a slot formed in the bottom 54 of the housing.

The mounting plate 51 with the mirror 10b can be tilted about the blade 53 by means of adjusting screws 55. Around the adjusting screws 55, between the bottom 54 and the mounting plate 51, there are arranged resilient elements in the form of helical springs 56. Furthermore, between the heads 57 of the adjusting screws 55 and the mounting plate 51 there are arranged resilient elements in the form of helical springs 59 in order to enable the mounting plate 51 to be displaced smoothly when the adjusting screws 55 are turned.

Figure 2C:
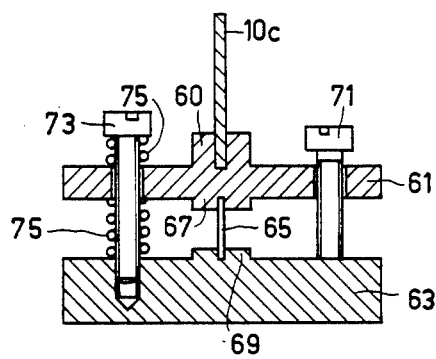

FIG. 2c is a sectional view of a part of another optical branch coupler according to the invention. The mirror 10c is secured in a slot in a thickened portion 60 of a mounting plate 61. The mounting plate 61 is connected to the bottom 63 of the beam splitter by means of an elastic strip, for example in the form of a leaf spring 65. The elastic strip 65 is clamped in grooves formed in thickened portions 67 and 69 of the mounting plate 61 and the bottom 63, respectively. The mirror 10c can be tilted with respect to the bottom 63 by means of an adjusting screw 71 screwed into the mounting plate 61. In order to ensure a smooth adjustment, there is provided a balance screw 73 which is screwed into the bottom 63 and which clamps the mounting plate 61 by means of two helical springs 75.

Figure 3A:
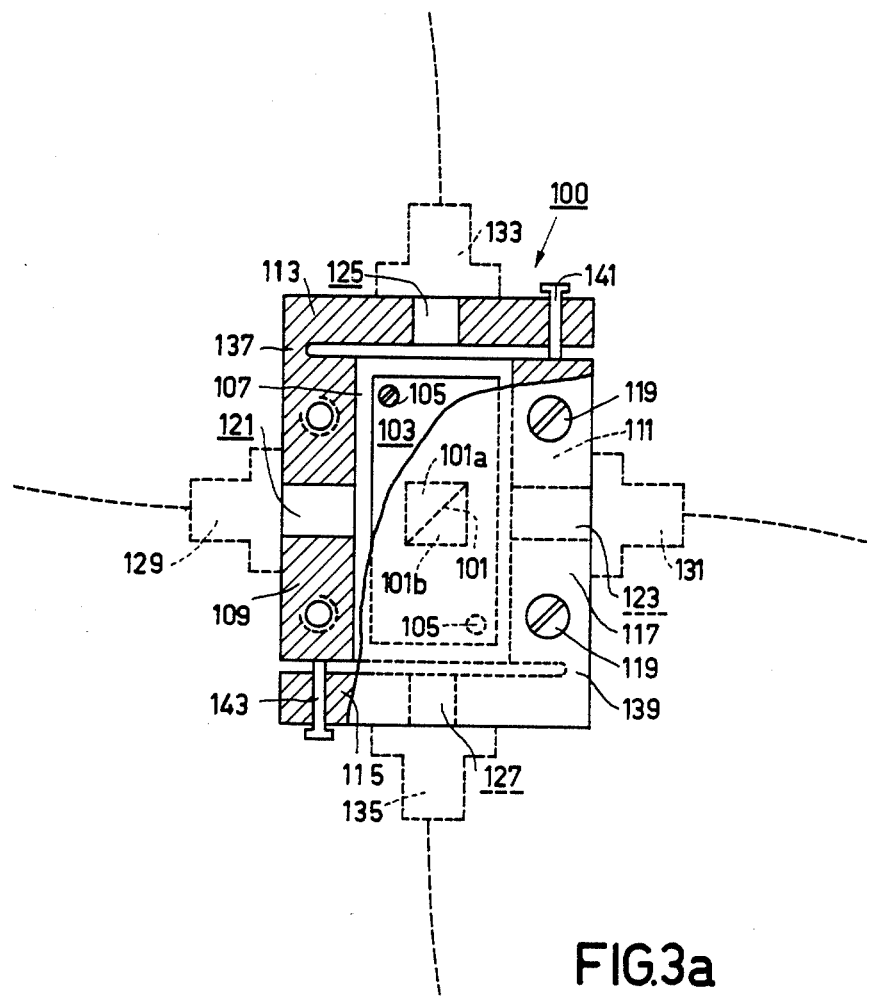
FIGS. 3a and 3b are partial cross-sections through adjustable walls according to the invention.

The arrangements of the mirrors 10a, 10b and 10c shown in FIGS. 2a, 2b and 2c allow the mirror to be adjusted with only one degree of freedom (rotation about the axis 34 of FIG. 1b). FIG. 3a is a partly cutaway plan view of an optical branch coupler according to the invention. The coupler comprises a housing 100 with a semi-transparent mirror 101 which is mounted on a mounting plate 103. The mirror 101 consists of two prisms 101a and 101b which are arranged against one another at their broader faces. The mirror may alternatively comprise a flat plate (see FIGS. 2a, 2b, and 2c). The mounting plate 103 is adjustably mounted on the bottom 107 of the housing 100 by means of one of the described constructions using screws 105.

The housing 100 comprises four side walls 109, 111, 113 and 115, the walls 109 and 111 being rigidly connected to the bottom 107. A lid 117 is secured to the walls 109 and 111 by means of screws 119. All four walls 109, 111, 113 and 115 are provided with an opening 121, 123, 125 and 127, respectively. Furthermore, all walls 109, 111, 113 and 115 are provided with fixing means (not shown) for detachably coupling the optical fiber connectors 129, 131, 133 and 135 to the housing 100. Such fixing means are known per se and may comprise, inter alia, screwed or bayonet fastenings.

Each connector 129, 131, 133 and 135 comprises at least one lens for collimating and focusing a (diverging) light beam emerging from an optical fiber or a light beam to be radiated into an optical fiber, respectively. Connectors of this kind are known per se from U.S. Pat. No. 4,265,511 and U.K. Patent Application 2,054,896 (corresponding to Netherlands Patent Applications 78.06829 and 79.05610, respectively). The second degree of freedom of adjustment of the mirror 101 (rotation around axes 31, FIG. 1b) is "replaced" by a rotation of the walls 113 and 115. The walls 113 and 115 are connected to the other walls 109 and 111 of the housing 100 of the branch coupler by means of elastic bridges 137 and 139, respectively. The walls 113 and 115 are each rotatable with respect to the housing 100 by means of adjusting screws 141 and 143, respectively. The axis of rotation is determined by the elastic bridge 137 or 139.

Figure 3B:
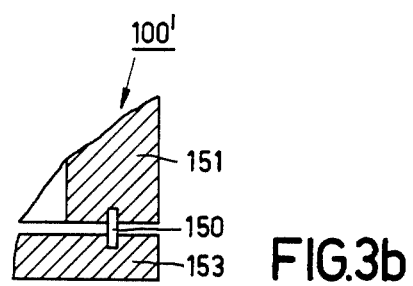

FIG. 3b is a detailed sectional view of a preferred embodiment of an elastic bridge 150 between a rigid wall 151 and the rotatable wall 153 of a housing 100' of an optical branch coupler according to the invention. The elastic bridge 150 is an elastic strip (for example, a leaf spring) which is secured in slots formed in the walls 151 and 153 by means of glue or by clamping.

What is claimed is:

1. An optical branch coupler for splitting an incoming light beam from a light source into two outgoing light beams or for combining two incoming light beams from respective light sources into one outgoing light beam, said coupler comprising:

a housing having a bottom wall and first, second and third side walls having openings, said first and second side walls being fixed to the bottom wall substantially perpendicular thereto and substantially parallel to each other, said third side wall being mounted substantially perpendicular to the first and second side walls and to the bottom wall; and an optical element arranged in the housing between the first and second side walls, said optical element arranged to transmit part of a light beam incident thereon via the opening in the first side wall to the opening in the second side wall, said optical element arranged to reflect the nontransmitted part of a light beam incident thereon via the opening in the first side wall to the opening in the third side wall; characterized in that:

the optical element is mounted on a mounting plate which is connected to the bottom wall of the housing by an elastic bridge, said mounting being pivotably adjustable about a first axis which extends parallel to an optical surface of the optical element and parallel to the bottom wall of the housing;

the third side wall is connected to the first or second side wall so that it is pivotably adjustable about a second axis which extends perpendicular to the bottom wall; and the coupler further comprises an adjusting screw in the mounting plate to adjust the optical element about the first axis by deforming the elastic bridge.

2. An optical branch coupler as claimed in claim 1, characterized in that the elastic bridge is an elastic strip which is secured in slots formed in the mounting plate and in the bottom wall of the housing.

3. An optical branch coupler as claimed in claim 2, characterized in that the elastic strip is a leaf spring.

4. An optical branch coupler for splitting an incoming light beam from a light source into two outgoing light beams or for combining two incoming light beams from respective light sources into one outgoing light beam, said coupler comprising:

a housing having a bottom wall and first, second and third side walls having openings, said first and second side walls being fixed to the bottom wall substantially perpendicular thereto and substantially parallel to each other, said third side wall being mounted substantially perpendicular to the first and second side walls and to the bottom wall; and an optical element arranged in the housing between the first and second side walls, said optical element arranged to transmit part of a light beam incident thereon via the opening in the first side wall to the opening in the second side wall, said optical element arranged to reflect the nontransmitted part of a light beam incident thereon via the opening in the first side wall to the opening in the third side wall; characterized in that:

the optical element is mounted on a first side of a mounting plate, said mounting plate having a groove on a second side opposite to the first side;

the mounting plate rests on a blade secured in the bottom wall of the housing, said blade projecting into the groove in the mounting plate such that the optical element is pivotably adjustable about a first axis which extends parallel to an optical surface of the optical element and parallel to the bottom wall of the housing;

the third side wall is connected to the first or second side wall so that it is pivotably adjustable about a second axis which extends perpendicular to the bottom wall; and the coupler further comprises adjusting screws which pass through the mounting plate and engage the bottom wall of the housing, and resilient elements which are arranged between the bottom wall of the housing and the mounting plate, said adjusting screws and resilient elements being provided for adjusting the optical element about the first axis.

5. An optical branch coupler for splitting an incoming light beam from a light source into two outgoing light beams or for combining two incoming light beams from respective light sources into one outgoing light beam, said coupler comprising:

a housing having a bottom wall and first, second and third side walls having openings, said first and second side walls being fixed to the bottom wall substantially perpendicular thereto and substantially parallel to each other, said third side wall being mounted substantially perpendicular to the first and second side walls and to the bottom wall; and an optical element arranged in the housing between the first and second side walls, said optical element arranged to transmit part of a light beam incident thereon via the opening in the first side wall to the opening in the second side wall, said optical element arranged to reflect the nontransmitted part of a light beam incident thereon via the opening in the first side wall to the opening in the third side wall; characterized in that:

the optical element is mounted on a mounting plate which is connected to the bottom wall of the housing by an elastic bridge, said mounting being pivotably adjustable about a first axis which extends parallel to an optical surface of the optical element and parallel to the bottom wall of the housing;

the third side wall is connected to the first or second side wall so that it is pivotably adjustable about a second axis which extends perpendicular to the bottom wall;

the coupler further comprises an adjusting screw in the mounting plate to adjust the optical element about the first axis by deforming the elastic bridge; and the first axis is situated substantially in the plane of the optical surface.

6. An optical branch coupler as claimed in claim 5, characterized in that the optical surface is the surface which reflects part of the incident light beam.

7. An optical branch coupler as claimed in claim 5, characterized in that the elastic bridge is an elastic strip which is secured in slots formed in the mounting plate and in the bottom wall of the housing.

8. An optical branch coupler as claimed in claim 7, characterized in that the elastic strip is a leaf spring.

9. An optical branch coupler as claimed in claim 5, characterized in that the third side wall is connected to the first or second side wall by an elastic bridge.

10. An optical branch coupler as claimed in claim 9, characterized in that the elastic bridge is an elastic strip which is secured in slots formed in the third side wall and in the first or second side wall.

11. An optical branch coupler for splitting an incoming light beam from a light source into two outgoing light beams or for combining two incoming light beams from respective light sources into one outgoing light beam, said coupler comprising:

a housing having a bottom wall and first, second and third side walls having openings, said first and second side walls being fixed to the bottom wall substantially perpendicular thereto and substantially parallel to each other, said third side wall being mounted substantially perpendicular to the first and second side walls and to the bottom wall; and an optical element arranged in the housing between the first and second side walls, said optical element arranged to transmit part of a light beam incident thereon via the opening in the first side wall to the opening in the second side wall, said optical element arranged to reflect the nontransmitted part of a light beam incident thereon via the opening in the first side wall to the opening in the third side wall; characterized in that:

the optical element is mounted on a first side of a mounting plate, said mounting plate having a groove on a second side opposite to the first side;

the mounting plate rests on a blade secured in the bottom wall of the housing, said blade projecting into the groove in the mounting plate such that the optical element is pivotably adjustable about a first axis which extends parallel to an optical surface of the optical element and parallel to the bottom wall of the housing;

the third side wall is conncted to the first or second side wall so that it is pivotably adjustable about a second axis which extends perpendicular to the bottom wall;

the coupler further comprises adjusting screws which pass through the mounting plate and engage the bottom wall of the housing, and resilient elements which are arranged between the bottom of the housing and the mounting plate, said adjusting screws and resilient elements being provided for adjusting the optical element about the first axis; and the first axis is situated substantially in the plane of the optical surface.

12. An optical branch coupler as claimed in claim 11, characterized in that the optical surface is the surface which reflects part of the incident light beam.

* * * * *